Patented May 3, 1938

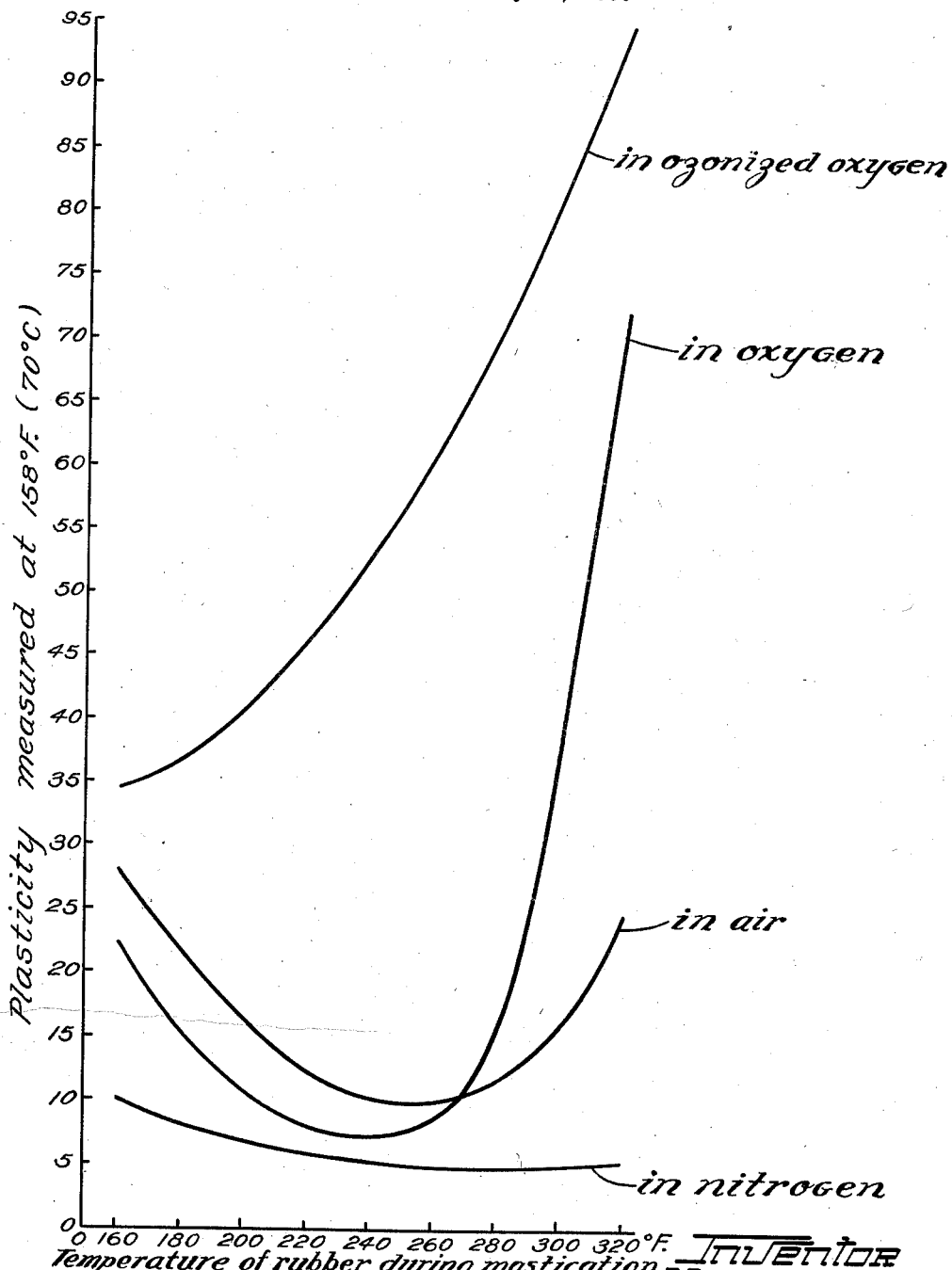
The effect of temperature on the plasticization of rubber when masticated in various gases.

2,115,705

UNITED STATES PATENT OFFICE 2,115,705

METHOD OF PLASTICIZING RUBBER

Warren F. Busse, Akron, Ohio, assignor to The B. F. Goodrich Company, New York, N. Y., a corporation of New York Application July 18, 1936, Serial No. 91,366

5 Claims. (Cl. 18—50)

This invention relates to a method of plasticizing rubber by means of concurrent intensive mechanical working and chemical treatment of the rubber with oxidizing gases and has for its principal object the provision of economical procedure for efficiently reducing rubber to a desirable plastic state in minimum time and with a minimum of mechanical working and power consumption. The manner in which this and other objects of the invention are attained will be apparent from the following description of the invention in which reference will be made to the accompanying drawing of which the single figure is a chart graphically illustrating the effect of variations in temperature on the rate of plasticization of rubber when the rubber is masticated in atmospheres of various gases.

In the manufacture of commercial articles from rubber, it is usually necessary as a preliminary step to reduce the ordinarily elastic and resilient rubber to a more or less plastic condition suitable for molding, calendering, spreading, extrusion, or solution processes. This necessary plasticization ordinarily is effected by subjecting the rubber to continued intensive mechanical working, termed "mastication", upon a conventional two-roll rubber mill, or in an internal mixer such as the large "Banbury" type mixers used in the rubber industry, or in a continuous extrusion type masticating apparatus such as the "Gordon plasticator" which more recently has been used to a considerable extent for plasticizing rubber. All such apparatus must be quite massive and strongly constructed in order to withstand the enormous pressures developed in subjecting masses of rubber to the intensive mechanical working necessary to effect any substantial plasticization, and it is only such intensive mechanical working effective to plasticize masses of rubber which is contemplated herein when the terms "mastication" or "intensive mechanical working" are used.

The principles underlying the present invention can best be appreciated by comparing the results obtained in a series of tests in which successive batches of rubber of similar initial plasticity characteristics were masticated in atmospheres of different gases and under varying temperature conditions. In all the tests to be described, the processing of the rubber was carried out in a laboratory size Schiller type internal mixer with Banbury type blades individually driven by separate 2½ H. P. motors, a jacket for circulating steam or cooling water as required to maintain the desired temperature of the rubber undergoing mastication as measured by a thermocouple extending into the mixer chamber so that the thermocouple was in contact with the rubber being processed, and a tight-fitting cover, with an inlet and outlet for circulating gas through the mixer chamber. The plasticity of the rubber in all cases was measured at 158° F. (70° C.) with a Goodrich simplified plastometer.

In the tests, successive 730 gram batches of the same lot of smoked sheets crude rubber which had been pre-masticated for fifteen minutes on a two-roll mill according to conventional practice and having a plasticity of 6.3±0.3 units were placed in the mixer and masticated for twenty minutes. In various tests, atmospheres of each of four gases, viz., commercial nitrogen gas (containing about 0.25 to 0.50 percent oxygen), ordinary air, commercial oxygen gas, and ozonized oxygen gas produced by passing oxygen through an oil-cooled ozonizer, were maintained in the mixer, in the case of air, by leaving the mixer open, and in the other cases, by passing the respective gases through the closed mixer in a steady stream under slight pressure sufficient to maintain the flow and prevent leakage of air into the mixer through the glands. In a series of tests with each of the four gases, the temperature of the rubber in successive tests was varied over a range extending from 160° F. to about 320° F. by circulating steam or cooling water through the mixer jacket as required. In each case, the final plasticity of the rubber was determined, and the data so obtained have been plotted to produce the four curves of the drawing showing the plasticity results obtained with the various gases indicated.

These tests show that when rubber is masticated in the presence of appreciable quantities of ordinary unactivated oxygen as in air or ordinary oxygen gas, the rate of plasticization decreases rapidly as the temperature is raised from 160° F. and reaches a minimum in the neighborhood of 240° F. to 260° F. where the plasticization is only slightly greater than in nitrogen, after which the rate of plasticization in air and oxygen increases with further increases in temperature.

When the mastication is carried out in an atmosphere containing a substantial proportion of activated oxygen such as ozonized oxygen, however, the effect is quite different and contrary to expectations, there is no decrease, but a continuous steady increase in the rate of plasticization as the temperature is raised from 160° F. to 320° F., so that extraordinarily effective plasticization may be achieved by masticating rubber in the presence of ozonized oxygen at the very temperatures at which mastication in the presence of ordinary oxygen is least effective, and for all practical purposes is almost completely ineffective, a result all the more surprising in view of the fact that ozone rapidly decomposes at such temperatures.

This discovery is of utmost importance because practical considerations ordinarily require that factory mastication operations be carried out at temperatures ranging from about 200° F. to about 300° F. Commercial operations at lower temperatures are as a practical matter prohibited by cooling difficulties as a great deal of heat is produced by the mechanical working of the rubber, while at temperatures higher than about 300° F. serious mechanical trouble is encountered by reason of seizure or failure of bearings in the masticating apparatus which are subjected to enormous pressures and high temperatures. Furthermore, thermal decomposition of the rubber becomes increasingly rapid at higher temperatures, and may produce substantial quantities of semi-liquid or liquid rubber decomposition products which are of course undesirable in rubber plasticized for use in ordinary manufacturing processes.

It therefore appears that really rapid plasticization in the preferred and in fact most readily attainable temperature range can be achieved only when the mastication is carried out in the presence of substantial quantities of activated oxygen, and furthermore that in the present process, the rate of plasticization is substantially accelerated throughout the preferred temperature range indicated, and that the acceleration amounts to several hundred percent. increase in the rate of plasticization through the greater part of the range.

While the operations herein described were carried out on a small scale in laboratory size apparatus, the principles involved are equally applicable to similar operations with full size factory equipment and the present invention obviously will effect substantial economies in factory use for plasticizing rubber.

The activated oxygen utilized in the present process may be supplied as ozone, ozonized oxygen, ozonized air, etc., prepared in any well known manner and either alone or admixed with other gases. The oxidizing gas may be caused to flow through the masticating apparatus if it be of the enclosed type, or the gas may be released near the surface of rubber being masticated upon a roll mill which preferably should be equipped with a hood to confine the gas.

The term "rubber" has been used in the specification and claims in a generic sense to include caoutchouc, balata, gutta percha, reclaimed rubber, and analogous natural or synthetic materials which are plasticized in substantially the same manner as rubber.

While the invention has been described in considerable detail with reference to certain preferred procedures, apparatus and materials, it is understood that numerous modifications and variations therein may be made without departing from the scope of the invention as defined by the appended claims.

I claim:

1. The method of plasticizing rubber which comprises subjecting a mass of the rubber to continued intensive mechanical working in an essentially closed chamber, treating the rubber while it is undergoing such working with a gas containing a substantial proportion of activated oxygen, and maintaining the temperature of the rubber during such treatment at a temperature of from 200° F. to 300° F.

2. The method of plasticizing rubber which comprises subjecting a mass of the rubber to continued intensive mechanical working in an essentially closed chamber, treating the rubber while it is undergoing such working with a gas containing a substantial proportion of ozone, and maintaining the temperature of the rubber during such treatment at a temperature of from 200° F. to 300° F.

3. The method of plasticizing rubber which comprises masticating the rubber at a temperature at which ordinary mastication in the presence of unactivated oxygen is relatively ineffective, and improving the efficiency of the plasticization by treating the rubber while it is undergoing mastication at such a temperature with a gas containing a substantial proportion of activated oxygen.

4. The method of plasticizing rubber which comprises subjecting a mass of the rubber to continued intensive mechanical working effective to masticate the rubber in an essentially closed chamber, treating the rubber while it is undergoing such working with a gas containing a substantial proportion of ozone, and maintaining the temperature of the rubber during such treatment at a temperature at which ozone is decomposed.

5. The method of plasticizing rubber which comprises subjecting a mass of the rubber to continued intensive mechanical working effective to masticate the rubber, passing a stream of gas containing a substantial proportion of activated oxygen over the rubber undergoing such working, and maintaining the temperature of the rubber during such treatment at a temperature of not less than 200° F.

WARREN F. BUSSE.